United States Patent [19]

Baker et al.

[11] Patent Number: 4,660,320
[45] Date of Patent: Apr. 28, 1987

[54] BAIT STATION FOR SMALL RODENTS

[75] Inventors: Stanley Z. Baker, Pepper Pike; Benjamin H. Baker, Chesterland; Bart M. Baker, Richmond Hts., all of Ohio

[73] Assignee: J. T. Eaton & Company, Twinsburg, Ohio

[21] Appl. No.: 918,031

[22] Filed: Oct. 14, 1986

[51] Int. Cl.⁴ .............................................. A01M 25/00
[52] U.S. Cl. ....................................................... 43/131
[58] Field of Search .................................. 43/131, 124

[56] References Cited

U.S. PATENT DOCUMENTS

| | | | |
|---|---|---|---|
| 3,303,600 | 2/1967 | Freeman | 43/131 |
| 4,349,982 | 9/1982 | Sherman | 43/131 |
| 4,453,337 | 6/1984 | Williams | 43/131 |
| 4,550,525 | 11/1985 | Baker | 43/131 |
| 4,619,071 | 10/1986 | Willis | 43/131 |

Primary Examiner—Gene P. Crosby
Attorney, Agent, or Firm—Body, Vickers & Daniels

[57] ABSTRACT

A tamper proof, non-spilling bait station for small rodents is provided with a generally pentagonal shape suitable for placement in a 90° room corner. Two rodent entranceways located in two outer walls of the container provide rodent access to a single rodent passageway which extends generally around the inner periphery of the enclosure. The rodent passageway leads to a single bait containment chamber. The rodent entranceways are partially occluded by primary and secondary anti-contamination barriers while the rodent passageway is provided with a plurality of bait containment barriers which serve to minimize spillage or tracking of poisonous bait. A removable lid extends over the outer walls of the container thus enclosing the rodent passageway and bait containment chamber.

18 Claims, 6 Drawing Figures

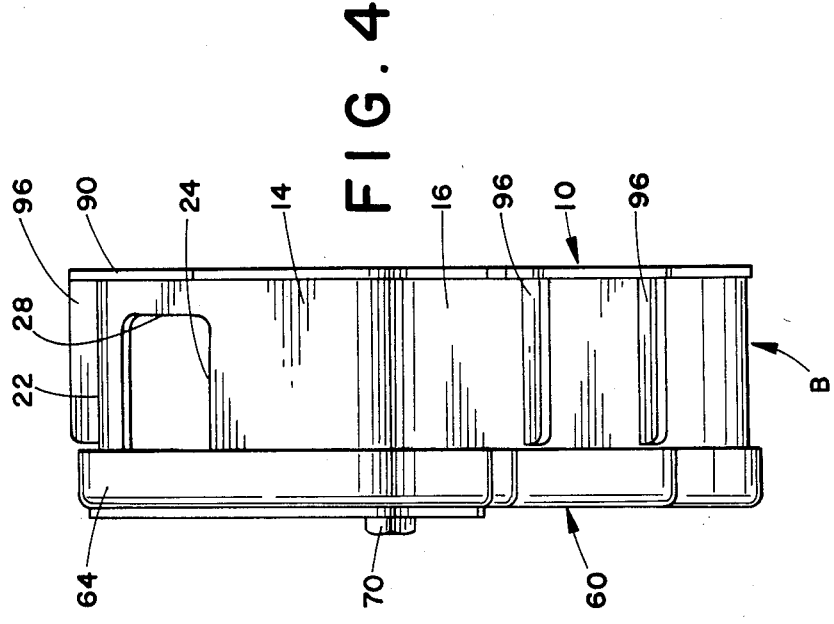
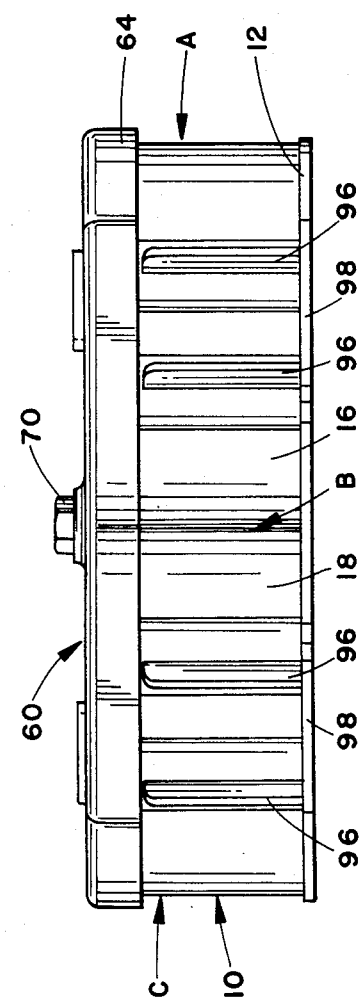
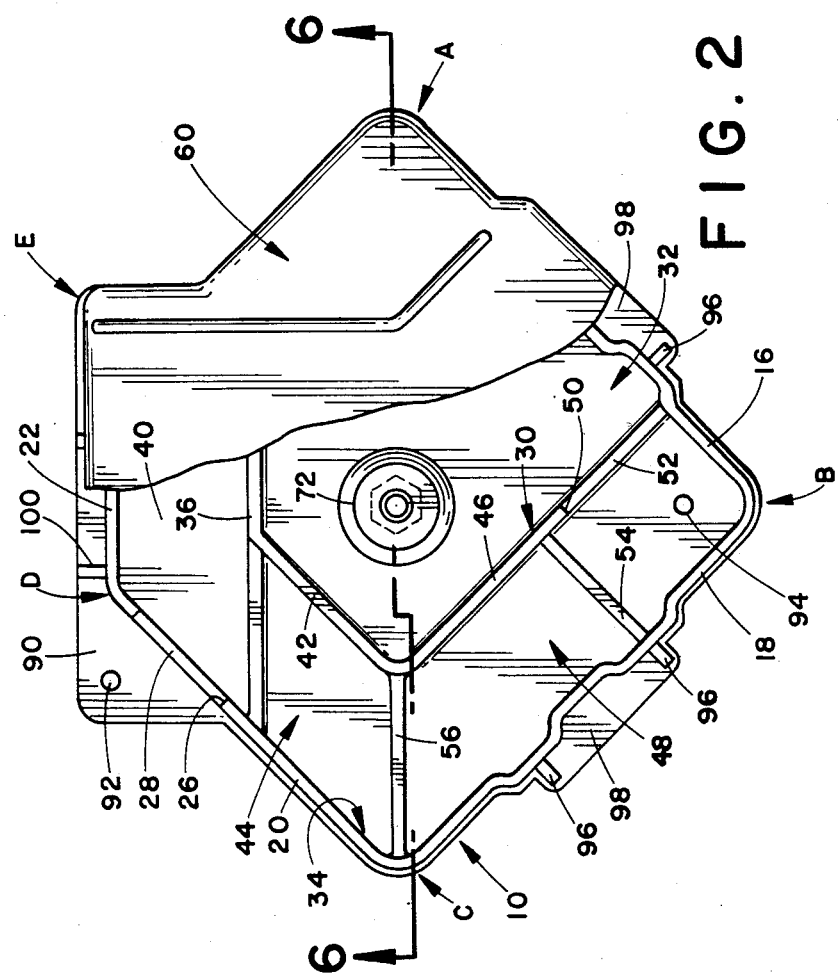

BAIT STATION FOR SMALL RODENTS

BACKGROUND OF THE INVENTION

The present invention relates generally to the art of rodenticide containers and specifically to a non-spilling tamper proof rodent bait container for the extermination of small rodents.

It is common practice to control or eliminate rodent populations by placing a rodenticide in a place where it is likely to be ingested by such animals. Numerous highly effective rodenticides are known and readily available to the public. These poisons are generally prepared in food-like, edible formats which are appealing to rats and mice. Unfortunately, the toxic effects of such preparations are not specific to rodents. They are also toxic to and pose a danger to the safety of domestic animals, desirable species of wild animals, and humans.

Because of their foodlike physical qualities, rodenticide preparations, or "rodent baits" which are left in openly accessible areas may be purposefully ingested by pet animals or unknowing children. In order to prevent such accidental poisonings, it is desirable to place the rodent bait in a container which will enable or even induce target rodents to enter thereinto and ingest the poison, while at the same time rendering the poison inaccessible to larger size animals and humans. In addition, such containers should be constructed to be essentially tamper proof and non-spilling in the event that the container is tampered with.

Ideally, rodent bait containers should also be constructed to prevent the entry of environmental water or liquid sewage which may collect outside the container. Additionally, such containers should exclude ultraviolet radiation from penetrating thereinto. The exclusion of light from the container interior provides an environment within the container which is inviting to nocturnal animals such as rats and mice.

U.S. Pat. No. 4,550,525 describes a rodent bait container having a generally triangular shape with a single central passageway connecting two rodent entranceways with two separate bait containment chambers. At the inner end of the passageway of the apparatus described in this patent, there are two rodent inaccessible vertical slitlike openings in the outer wall of the container. These openings are visible from the central passageway of the container and are intended to provide an apparent means of egress whereby hesitant rodents will be enticed to further enter the container. Also, the container shown in the above-referred to patent is provided with single anti-contamination lips or barriers extending across each rodent entranceway. These anti-contamination lips are intended to prevent the undesired flow of environmental water or other fluids into the container.

Practical experience has shown the rodent bait container of the above patent to be an extremely functional and indeed tamper resistant bait station for use in exterminating rats and other large rodents. Continued experimentation has, however, shown that the device of this patent is not optimally sized or designed for the extermination of mice and other small rodents. As a result, we have conceived of a bait container which, by our present standard of knowledge, it optimally designed for small rodents. As described herein, the rodent bait station of the present invention differs markedly from the apparatus described in the above-mentioned patent.

SUMMARY OF THE INVENTION

The present invention contemplates a new and improved tamper proof rodent bait station which overcomes the above referred to problems and provides a safe and effective rodent bait station particularly sized and designed for the extermination of small rodents such as mice.

In accordance with the present invention, there is provided a rodent bait protection and concealing boxlike container comprising a generally pentagonal shaped enclosure or housing having top and bottom walls and side enclosure walls extending vertically therebetween. Four of the outer walls (primary outer side walls) extend at right angles to one another while a diagonal fifth outer wall (secondary outer wall) completes the generally pentagonal enclosure. A three-sided inner partition wall of the housing defines therewithin a single bait containment chamber and a single rodent passageway extending generally around the inner periphery of the housing. The rodent passageway leads into the single bait containment chamber.

In accordance with another aspect of the invention, two rodent entranceways are respectively provided in the two primary outer side walls of the container adjacent each end of the diagonal fifth outer side wall, through which entranceways target animals may pass from outside the housing into the rodent passageway therein, each one of the entranceways being perceptible through the passageway to a rodent entering the other one of such entranceways.

In accordance with still another aspect of the invention, spillage or tracking of the poisonous bait to the outside of the container is prevented or minimized by the provision therein of a plurality of bait containment barriers at various points along the bottom of the rodent passageway.

In accordance with a further aspect of the invention, the passage of environmental water or other fluids from outside the housing into the bait containment area is prevented or minimized by the provision of primary anti-contamination barriers across each of the rodent entranceways and at least one secondary anti-contamination barrier across the rodent passageway internally of the two entranceways.

In accordance with a still further aspect of the invention, the container is provided with a removable lid which, when fastened in place, extends over and engages the top edges of the five outer walls to form the top wall of the container enclosing the bait containing chamber and rodent passageway thereof.

According to yet another aspect of the invention, the rodent bait container is provided with a centrally located mounting arrangement for supporting the container in proper upright position on the upper end of a vertical support post and for removably securing the lid to the housing of the container.

According to still another aspect of the invention, the container corner which otherwise would be formed by the intersecting of the first and fourth walls of the container is truncated by the diagonal fifth wall which intersects with the first and fourth walls and forms the outside wall of the portion of the rodent passageway extending between the two rodent entranceways located in the first and fourth walls of the container.

According to a further aspect of the invention, the two entrance openings are provided in the first and fourth outer walls of the container adjacent the diagonal fifth outer wall thereof, and the inner partition wall is comprised of a diagonal first segment extending from the first outer side wall of the container in a direction parallel to the diagonal fifth outer side wall to form therewith a diagonal first section of the rodent passageway leading into the container from the rodent entranceway in the first outer wall, and a second segment of the inner partition wall extending from the inner end of the diagonal first segment thereof in a direction parallel to the fourth outer wall of the container and joining with a third segment of the partition wall extending parallel to the second outer wall of the container but terminating short of the first outer wall thereof to provide an entrance opening into the bait containment chamber of the housing, The principal object of the invention is to provide a tamper proof rodent bait container of optimum compact construction for luring mice and other small rodents thereinto and leading them through an internal circuitous passageway into an inner bait containment chamber of the container wherein the rodent bait is concealed and protected from access by children and domestic animals.

Another object of the invention is to provide a rodent bait container of the above described type which can be fabricated in quantity at very low cost and which is of durable construction and long lasting in use.

Still another object of the invention is to provide a rodent bait container of the above described type having a series of upstanding spaced baffles in the rodent entrance passageway thereof to inhibit spillage of bait and to prevent entry into the bait containment chamber of any water or other liquid that may collect around the outside of the container.

A further object of the invention is to provide a rodent bait container with a mounting arrangement for supporting the container in upright position on the upper end of a vertical support post or stake anchored in the ground or floor.

Further objects and advantages of the invention will be apparent from the following detailed description of a preferred species thereof and from the accompanying drawings.

DESCRIPTION OF THE DRAWINGS

In the drawings

FIG. 2 is a plan view of the bait container shown in FIG. 1 with the cover thereof shown partly broken away to reveal the interior passageways and bait containment chamber of the container;

FIG. 3 is a rear elevational view of the bait container looking in the direction from bottom to top in FIG. 2;

FIG. 4 is a side elevational view of the bait container looking in the direction from right to left in FIG. 2;

DESCRIPTION OF THE PREFERRED EMBODIMENT

Figure 1:
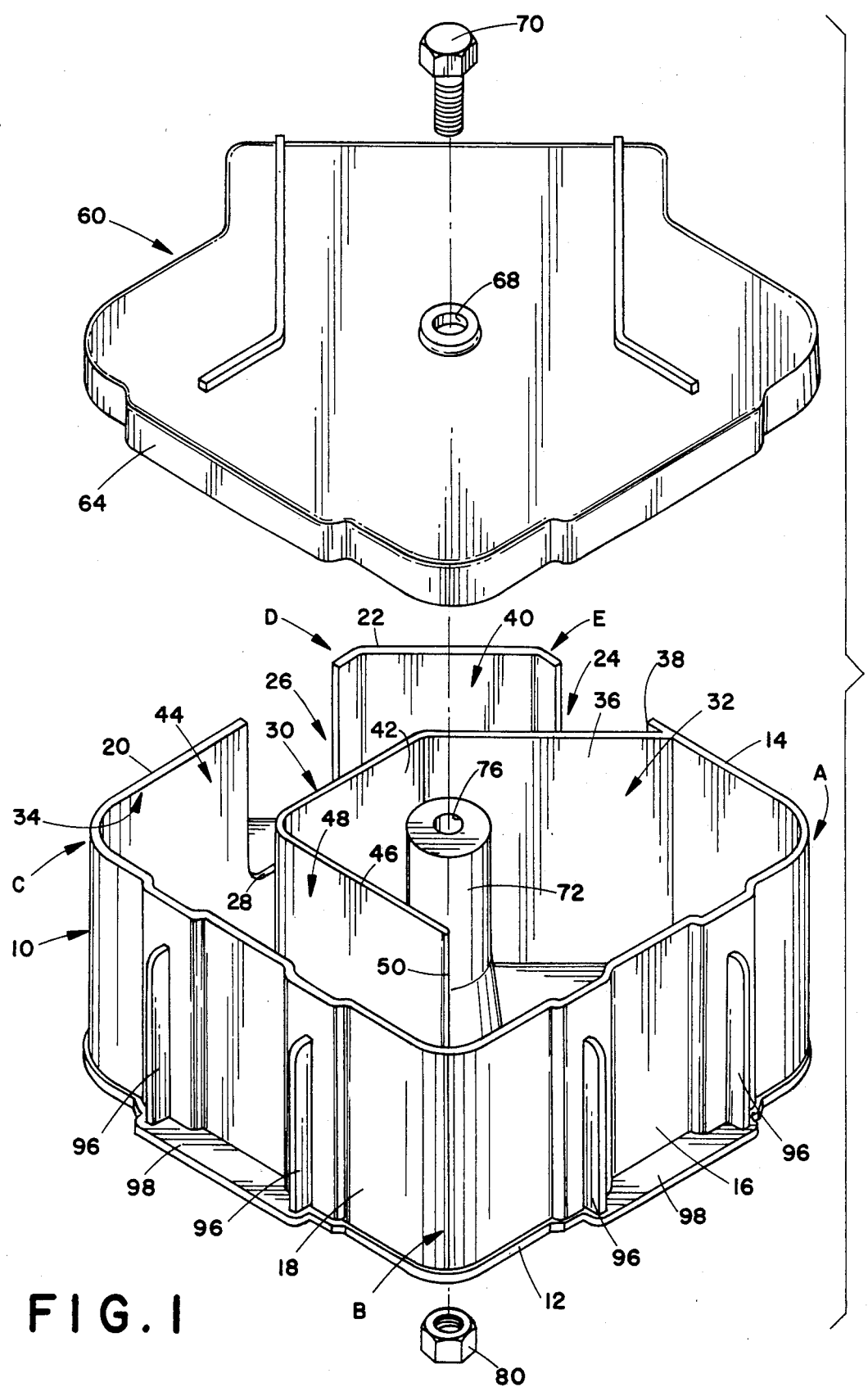
FIG. 1 is an exploded perspective view of a rodent bait container comprising the invention.

Referring now to the drawings wherein the showing is for the purpose of illustrating a preferred embodiment of the invention only and not for the purposes of limiting the same, FIG. 1 shows a container or box 10 having a generally pentagonal shape comprised of a floor 12 and first, second, third and fourth primary outer side or enclosure walls 14, 16, 18, 20, respectively, and a diagonal fifth outer side wall 22, all being the same height and extending upright from the floor and interconnectingly forming corners A, B, C, D and E. Side walls 14, 16, 18 and 20 extend at right angles to one another while the fifth outer side wall 22 extends diagonally between and preferably at 45° to the first and fourth side walls 14 and 20 so as to, in effect, truncate the imaginary corner which otherwise would be formed if the first and fourth outer walls 14 and 20 were to be continued so as to intersect with one another.

The first and fourth primary outer side walls 14 and 20 are provided with rodent access openings or entranceways 24 and 26, respectively, located therein adjacent the opposite ends of the diagonal fifth outer side wall 22. The entranceways 24 and 26 are of a width to permit small rodents to pass therethrough while effectively blocking passage of larger rodents such as rats and also domestic animals such as cats and dogs.

The container 10 is provided with primary anti-contamination means in the form of an upright lip or baffle 28 extending upwardly from the floor 12 across the full width of each respective rodent access or entrance opening 24, 26. The upright lip 28 has a height of around one-half inch and prevents or minimizes the passage of environmental water or other fluid from outside the housing into the bait containment area thereof where it might then contaminate the bait therein.

The container or box 10 may be made of any durable rigid material and, in a preferred embodiment, may be made of rigid plastic such as high-impact injection molded black plastic which is impervious to ultraviolet radiation such as might otherwise accelerate the chemical decomposition of the bait contained therein. The molded plastic container 10 may have a wall thickness of around 0.0625 inches, for example. The height of the enclosed side walls 14–22 is selected to be just sufficient to allow unimpeded passage of small size rodents within the container. For this purpose, the height of the enclosure side walls in the present embodiment is around 1 and ⅞ inches. Also to this end, each of the four primary outer side walls may be around 5 inches in length while the diagonal fifth outer wall 22 is approximately 1 and ½ inches in length.

The container 10 is provided interiorly thereof with a three-sided upright inner partition wall 30 corresponding in height to the outer side walls 14, 16, 18, 20 and 22 and extending upwardly from the container floor 12. The partition wall 30 divides the interior space of the container into a bait containment chamber or area 32 and a narrow passageway 34 extending generally around the inner periphery of the container or housing 10. As shown in FIG. 1, partition wall 30 extends from the first outer side wall 14 of the container 10 alongside and spaced around one inch or so from the diagonal fifth outer side wall 22 and from the fourth and third outer side walls 20 and 18 and joining with the second outer side wall 16, the wall spacing being just sufficient to accommodate only small size rodents such as mice in the passageway 34.

The partition wall 30 is comprised of a diagonal first segment 36 which extends from the first outer side wall 14 at a location adjacent the inward side edge 38 of the rodent access opening 24 therein in a direction parallel to and spaced from the diagonal outer side wall 22 to form therewith a diagonal first rodent passageway portion 40 extending straight between, and opening outwardly at its opposite ends to the exterior of the container through the rodent access openings 24, 26 in the side walls 14 and 20. As a result, a target rodent, upon encountering either of the rodent entranceways or openings 24 or 26 at one end of the diagonal rodent passageway portion 40, will be able to perceive a means of egress through the opposite entranceway at the opposite end of such diagonal passageway portion 40 and thereby will be induced to enter the passageway 34 of the container and follow it to the bait containment chamber 32 thereof and ultimately ingest the rodenticide contained therein.

A second segment 42 of the partition wall 30 extends from the inner end of the diagonal first segment 36 thereof parallel to and similarly spaced from the fourth outer side wall 20 of the container 10, and in a direction toward the third outer side wall 18 thereof to form with the fourth outer side wall 20 a second rodent passageway portion 44 extending parallel to the outer side wall 20. The second segment 42 of the partition wall 30 joins with a third segment 46 thereof which extends parallel and in similarly spaced relation to the third outer side wall 18 of the container 10, in a direction toward the outer side wall 16 thereof, to form with the third outer side wall 18 a third rodent passageway portion 48 extending parallel thereto and terminated at its inner end by the side wall 16. The third segment 46 of the partition wall 30 is joined at its end to the side wall 16 of the container 10 and is provided thereadjacent with a rodent ingress opening 50 from the passageway 34 which leads into the bait containment chamber 32 of the container 10. The rodent ingress opening 50 is of a width more or less corresponding to that of the entrance openings 24, 26 into the rodent passageway 34.

As shown in FIG. 2, the partition wall 30 is provided with primary bait containment means comprised of an upright lip or barrier 52 upstanding from the container floor 12 and extending across the rodent exit opening 50 in the partition wall to divide the rodent passageway 34 from bait containment chamber 32. Similar bait containment means comprised of upright lips or barriers 54 and 56 are interposed across the rodent passageway 34 at various spaced points therealong. In the preferred embodiment of the invention, these lips or barriers are approximately ⅛ inch in height and partially obstruct the rodent exit opening 50 and rodent passageway 34. The plurality of bait containment barrier means 52, 54 and 56 serve not only to prevent spillage of the rodenticide or bait out of the container 10 in the event the container is overturned or agitated but also to scrape or brush off any rodenticide which may adhere to the bodies of rodents exiting the container. Such scraping or brushing of the rodenticide from the bodies of the rodents occurs as they are forced to climb over the bait containment barriers 52, 54 and 56 in order to exit the container.

Figure 5:
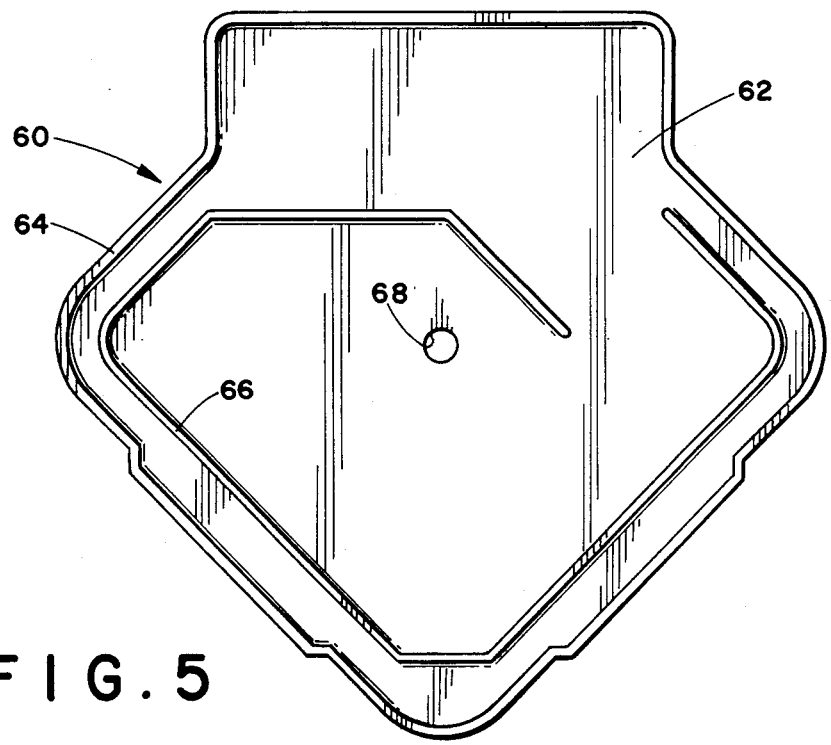
FIG. 5 is a bottom view of the top cover of the bait container.
Figure 6:
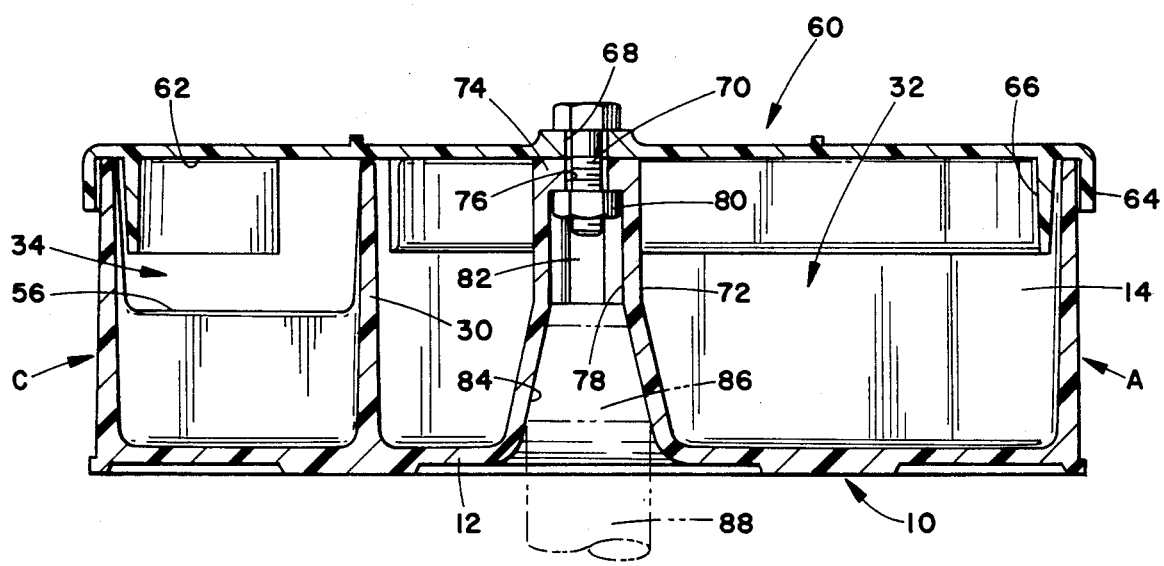
FIG. 6 is a vertical sectional view of the bait container taken on the line 6—6 of FIG. 2.

The container 10 includes a top wall which, in the preferred embodiment, is provided by a removable lid or cover 60. The cover has a contour which corresponds to the perimeter of the container or housing 10 and it overlies and is removably secured in place on top of the container with its flat underside 62 resting on and engaged with the top edges of the enclosure walls 14–22 and partition wall 30 to thereby close off the bait containment chamber 32 and rodent passageway 34 at their top regions from one another and also provide added support for the cover against accidental breakage. As shown in FIG. 6, the cover 60 is provided with a depending outer peripheral flange 64 therearound which overlaps and partially encloses the outer side walls 14–22 of the container 10 to prevent the ingress of water between the container and the cover and provide a professional finished appearance. As also shown in FIG. 5, the underside of the removable cover 60 is additionally provided with a depending continuous inner rib 66 which corresponds in contour with the inner faces of the outer side walls 14, 16, 18 and 20 and the wall segments 36 and 42 of the inner partition wall 30 to thereby serve as a registering means for fitting the cover 60 on top of the container 10 in proper position for securing it thereto. For this purpose, the height of the inner rib 66 (e.g., around ½ inch or so) is appreciably greater than the height of the outer peripheral flange 64 (e.g., around ¼ inch or so).

The rib 66 thus serves the dual purpose of a lid locating means for centering the lid or cover 60 in proper position on the container 10 during their assembly, and a spillage minimizing barrier to reduce rodenticide loss in the event that the closure means securing the cover or lid to the container should become loosened and the cover or lid then becomes partially separated from the container.

The cover 60 is provided with a centrally located aperture 68 for accommodating a threaded closure means such as a fastening bolt 70 for removably securing the cover onto the container 10. The simple single bolt locking device or closure means 70 for securing the cover or lid 60 in place on the container 10 meets the safety requirements of governmental protection agencies.

For securing the cover 60 in place on the container 10 and to further prevent against accidental breakage, the container 10 is provided with a centrally located upright hollow support post or projection 72 upstanding from the container floor 12 and formed at its upper end with a flat top end wall 74 against which the cover 10 is seated and clamped by the fastening bolt 70 to additionally support the cover 60 centrally thereof against accidental breakage. The end wall 72 is provided with a bolt-receiving opening 76 for accommodating the fastening bolt 70 therein. The tubular hollow interior 78 of the support post 72 is formed of large enough diameter throughout its vertical extent to permit the passage therethrough of a screw-threaded fastening nut 80 for the fastening bolt 70. As shown in FIG. 6, the hollow interior 78 of the support post 72 may be formed with an upper end portion 82 of uniform diameter throughout and having a cross-sectional shape, e.g., hexagonal as shown, closely matching that of the hexagonal or other multi-faceted shape fastening nut 80 so as to lock the nut against rotation when the fastening bolt 70 is screw-threaded thereinto to fasten the cover 60 to the container 10. Ease of assembly of the cover 60 and container 10 is thereby afforded. Further to this end, the hexagonal or other faceted shape upper end portion 82 of the hollow interior 78 of support post 72 may be of a cross-sectional size such as to have a press fit with the fastening nut 80 whereby the latter is firmly retained in place inside the hollow interior 78 of the support post 72 in abutting engagement with the end wall 74 thereof. Instead of a fastening nut 80, a threaded bushing (not shown) may be secured within the aperture 76 of the support post 72 as by molding it thereinto.

The lower end portion 84 of the hollow interior 78 of support post 72 may be formed of frusto-conical shape, as shown, so as to provide a snug fit, and thus a firm mounting of the assembled container 10 and cover 60 on a matching frusto-conical shaped upper end 86 of a mounting stake 88 such as a metal surveyor's stake; for instance, anchored at its lower end in the ground. In this connection, because of the centrally located position of the support post 72 on the container 10, such a stake-mounted container 10 is thus prevented from tipping and becoming dislodged from the mounting stake 88 as when a rodent crawls or jumps onto an offset region of the assembled container 10 and cover 60.

As shown in FIG. 2, the floor 12 of container 10 is preferably extended outwardly beyond the first, fourth and fifth outer side walls 14, 20 and 22, respectively, of the container, adjacent to the rodent entranceways 24 and 26 in walls 14 and 20, to thereby provide a mounting flange 90 on the container 10 for securing it to a room floor or other surface below. The flange 90 is provided with mounting holes 92 at the opposite ends thereof through which mounting screws may be passed to fasten the container 10 to the room floor or other rest surface. Also as shown, the container floor 12 is preferably provided with an additional mounting hole 94 located interiorly of the container enclosure walls 14–22 at a position adjacent to the corner B of the container, through which mounting hole 94 an additional mounting screw, may be passed to further secure the container 10 in place on the room floor.

The entire bait containment device as described herein is of a shape suitable for placement in a 90° room corner, with the second and third outer side walls 16 and 18 of the container 10 positioned closely alongside the room walls. When the container 10 is so positioned the rodent entranceways 24 and 26 will be readily encountered by target rodents traveling along the base of such room walls. Upon encountering a rodent entranceway 24 or 26, a target rodent will be able to perceive a means of egress through the opposite one of such entranceways 24 or 26 and will be induced to enter the rodent passageway 34 and bait containment chamber 32, and to ultimately ingest the rodenticide contained therein.

In order to better enable the placement of the container 10 in such a room corner in a manner which will insure that a rodent traveling along the base of either one of the corner-forming room walls in a direction toward the container 10 will be directed toward the rodent entranceway 24 or 26 instead of being able to pass through any space remaining between the container side walls 16, 18 and the adjacent room walls, the container side walls 16, 18 are each provided on their outer side with a spaced pair of outwardly projecting upright barrier ribs 96 upstanding from respective outwardly extended portions 98 of the container floor 12 and extending slightly outwardly beyond the depending flange 64 on the cover 60 and upwardly almost into abutting engagement with the depending peripheral flange 64 of the lid 60, as shown in FIGS. 3 and 4. The barrier ribs 96 effectively block any remaining space between the container side walls 16, 18 and the room corner walls, thereby preventing rodents from traveling through such space as a by-pass passageway around the outside of the container 10. A similar spaced pair of outwardly projecting upright barrier ribs 100 is provided on the outer side of the diagonal fifth outer side wall 22 of the container 10 for similarly blocking, and preventing passage of a rodent through, any space remaining between the container wall 22 and a room wall against which such container wall is positioned flat thereagainst in the mounted position of the container on the room floor.

This invention has been described with reference to a preferred embodiment thereof. Obviously, modifications and alterations will occur upon the reading and understanding of this specification. It is my intention to include all such modifications and alterations insofar as they come within the scope of the appended claims or the equivalents thereof.

Having thus described the invention, we claim:

1. A rodent bait device comprising:
   a generally pentagonal container including a floor;
   four adjoining primary outer side walls comprising first, second, third and fourth walls extending vertically from said floor and forming first, second and third corners of roughly 90°;
   a diagonal fifth outer side wall extending angularly between and interconnecting said first and fourth primary outer walls to form fourth and fifth corners therewith;
   a three sided inner partition wall abutting endwise against said first and second primary walls and forming therewith a bait containment chamber, said partition wall extending in generally parallel spaced relationship to said third, fourth and fifth outer walls and defining therewith a rodent passageway extending partially around the inner periphery of said container and leading into said bait containment chamber through an ingress opening in said partition wall located adjacent the terminus thereof and adjacent said second outer wall;
   a rodent access opening in each of said first and fourth walls at locations therein adjacent said diagonal fifth wall and leading into said rodent passageway; and,
   a removable cover fastened to said container and abutting against the top edges of said outer side walls and partition wall to form a top closure wall for said bait containment chamber and said rodent passageway.

2. A device as defined in claim 1, wherein said first, second, third and fourth primary outer side walls are of nominally equal length while said diagonal fifth outer side wall is comparatively shorter in length than either of said first, second, third and fourth primary outer side walls.

3. A device as defined in claim 1, wherein said removable cover is releasably secured to said container.

4. A device as defined in claim 1 and including primary bait anti-contamination means at said rodent access entrance.

5. A device as defined in claim 4 wherein said primary bait anti-contamination means consists of raised lip members upstanding from said floor and extending across each of said rodent access entrances.

6. A device as defined in claim 5 and including a secondary bait anti-contamination means consisting of a raised lip member upstanding from said floor and extending across said rodent passageway at a point spaced inwardly along the length of said passageway from the one of said rodent access entrances closest to the said ingress opening in said partition wall.

7. A device as defined in claim 1 including a primary bait containment means located at the said ingress opening in said partition wall and dividing said bait containment area from said rodent passageway.

8. A device as defined in claim 1 wherein a primary bait containment means consists of a raised lip member upstanding from said floor and extending across the said opening in said partition wall adjacent said second outer wall.

9. A device as defined in claim 8 and including secondary bait containment means consisting of at least one additional raised lip member extending upward from said floor and partially occluding said rodent passageway at a point therealong intermediate the said opening in said partition wall and the one of said rodent access entrances closest to said opening.

10. A device as defined in claim 1 and including a support post upstanding from said container floor generally centrally thereof, said cover abutting against the top end of said support port to additionally support the cover at the central region thereof.

11. A device as defined in claim 1 and including a hollow cover mounting post upstanding from said container floor generally centrally thereof for accommodating therewithin the top end of an upright mounting post.

12. A device as defined in claim 11 wherein the hollow interior of said upstanding post is of upright conical shape to firmly fit onto the conical top end of an upright mounting post.

13. A device as defined in claim 11 wherein said hollow upstanding post includes therein a threaded cover-attaching bushing means.

14. A device as defined in claim 11 wherein at least the innermost end portion of the hollow interior of said upstanding post is shaped correspondingly to the outer surface of a faceted fastener nut to fit closely therearound so as to thereby prevent rotational movement of said fastener nut within the hollow interior of said post when a fastening bolt is screw-threaded thereinto.

15. A rodent bait device as defined in claim 1 wherein the said cover is provided on its underside with a depending continuous outer peripheral flange enveloping the said outer side walls of said container to a relatively short vertical extent and fitting closely therearound.

16. A rodent bait device as defined in claim 1 wherein the said cover is provided on its underside with a depending continuous inner rib corresponding in configuration to the inner sides of and closely fitting within said inner partition wall and said first, second, third and fourth outer side walls of said container.

17. A rodent bait device as defined in claim 15 wherein the said cover is provided on its underside with a depending continuous inner rib corresponding in configuration to the inner sides of and closely fitting within said inner partition wall and said first, second, third and fourth outer side walls of said container.

18. A rodent bait device as defined in claim 17 wherein the said depending continuous inner rib is of substantially greater vertical height than the said outer peripheral flange on said cover to thereby initially register the cover in proper assembled position on said container for fastening thereto.

* * * * *